United States Patent [19]

Gregg

[11] Patent Number: 5,630,866
[45] Date of Patent: May 20, 1997

[54] STATIC ELECTRICITY EXHAUST TREATMENT DEVICE

[76] Inventor: Lloyd M. Gregg, 1974 42nd Ave., San Francisco, Calif. 94116

[21] Appl. No.: 508,741

[22] Filed: Jul. 28, 1995

[51] Int. Cl.[6] .................................................. B03C 3/70
[52] U.S. Cl. .................... 96/67; 55/276; 55/385.3; 55/DIG. 30; 60/275; 96/88; 96/98; 123/198 E
[58] Field of Search .................. 96/67, 98, 66, 96/59, 88; 60/275; 55/385.3, 276, DIG. 30; 123/198 E

[56] References Cited

U.S. PATENT DOCUMENTS

| | | | |
|---|---|---|---|
| 2,888,092 | 5/1959 | Powers | 96/67 |
| 3,610,360 | 10/1971 | Gardner | 55/DIG. 30 |
| 3,702,965 | 11/1972 | Drexler et al. | 322/25 |
| 3,748,830 | 7/1973 | Ross et al. | 55/276 X |
| 3,791,752 | 2/1974 | Gardner | 55/385.3 X |
| 4,077,888 | 3/1978 | Rhoades et al. | 55/385.3 X |
| 4,077,889 | 3/1978 | Rhoades et al. | 55/385.3 X |
| 4,323,374 | 4/1982 | Shinagawa et al. | 96/67 X |
| 4,385,340 | 5/1983 | Kuroshima | 361/228 |
| 4,477,767 | 10/1984 | Cotzas | 322/59 |
| 4,587,807 | 5/1986 | Suzuki | 55/385.3 X |
| 4,823,549 | 4/1989 | Moser | 55/DIG. 30 |
| 4,862,315 | 8/1989 | Cubbison, Jr. | 361/212 |
| 4,978,372 | 12/1990 | Pick | 96/67 |
| 5,055,115 | 10/1991 | Yikai et al. | 96/66 X |
| 5,055,794 | 10/1991 | Kawashima | 324/453 |
| 5,150,499 | 9/1992 | Berfield | 15/327.1 |
| 5,277,703 | 1/1994 | Sklenak et al. | 95/77 |
| 5,329,910 | 7/1994 | Tanaka | 123/536 |
| 5,351,354 | 10/1994 | Hasumi et al. | 15/1.51 |

*Primary Examiner*—Richard L. Chiesa

[57] ABSTRACT

A device for treating automobile exhaust with a static electrical charge. The inventive device includes a housing having inlet and outlet ports positionable into communication with an exhaust pipe of a vehicle. A folded mesh panel undulates through the housing and receives a static electrical charge from a generator to reduce emissions from exhaust gases passing therethrough.

8 Claims, 2 Drawing Sheets

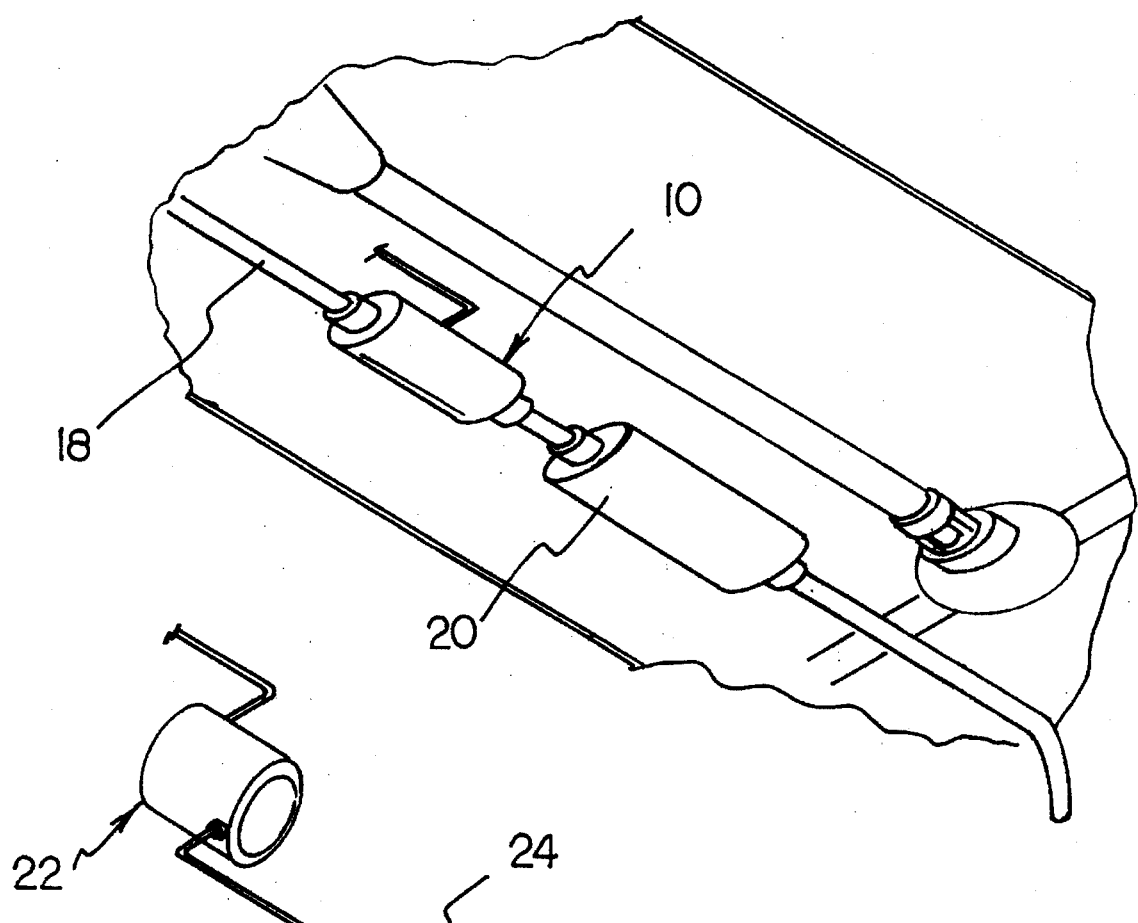
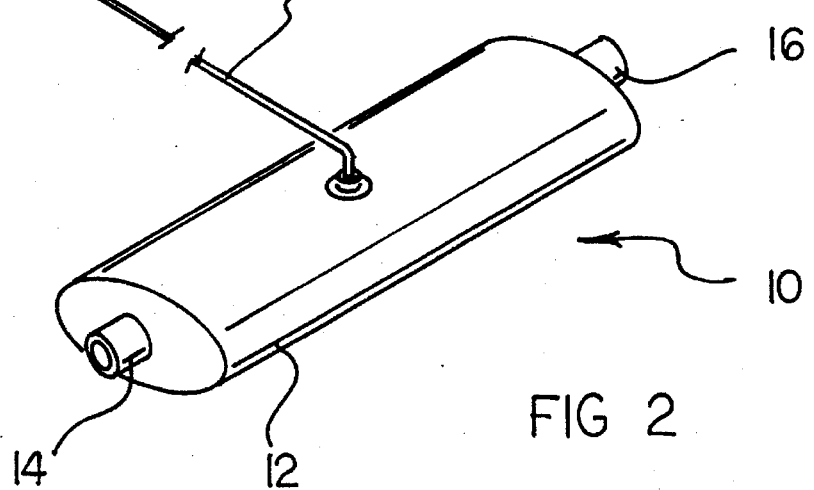

STATIC ELECTRICITY EXHAUST TREATMENT DEVICE

BACKGROUND OF THE INVENTION

1. Field of the Invention

The present invention relates to automobile exhaust emission controls and more particularly pertains to a static electricity exhaust treatment device for treating automobile exhaust with a static electrical charge.

2. Description of the Prior Art

The use of automobile exhaust emission controls is known in the prior art. More specifically, automobile exhaust emission controls heretofore devised and utilized are known to consist basically of familiar, expected and obvious structural configurations, notwithstanding the myriad of designs encompassed by the crowded prior art which have been developed for the fulfillment of countless objectives and requirements.

Known prior art automobile exhaust emission controls include U.S. Pat. Nos. 5,329,910; 5,351,354; 5,055,794; 5,150,499; 5,277,703; and 4,862,315.

While these devices fulfill their respective, particular objectives and requirements, the aforementioned patents do not disclose a static electricity exhaust treatment device for treating automobile exhaust with a static electrical charge which includes a housing having inlet and outlet ports positionable into communication with an exhaust pipe of a vehicle, and a folded mesh panel undulating through the housing and receiving a static electrical charge to reduce emissions from exhaust gases passing therethrough.

In these respects, the static electricity exhaust treatment device according to the present invention substantially departs from the conventional concepts and designs of the prior art, and in so doing provides an apparatus primarily developed for the purpose of treating automobile exhaust with a static electrical charge.

SUMMARY OF THE INVENTION

In view of the foregoing disadvantages inherent in the known types of automobile exhaust emission controls now present in the prior art, the present invention provides a new static electricity exhaust treatment device construction wherein the same can be utilized for treating automobile exhaust with a static electrical charge. As such, the general purpose of the present invention, which will be described subsequently in greater detail, is to provide a new static electricity exhaust treatment device apparatus and method which has many of the advantages of the automobile exhaust emission controls mentioned heretofore and many novel features that result in a static electricity exhaust treatment device which is not anticipated, rendered obvious, suggested, or even implied by any of the prior art automobile exhaust emission controls, either alone or in any combination thereof.

To attain this, the present invention generally comprises a device for treating automobile exhaust with a static electrical charge. The inventive device includes a housing having inlet and outlet ports positionable into communication with an exhaust pipe of a vehicle. A folded mesh panel undulates through the housing and receives a static electrical charge from a generator to reduce emissions from exhaust gases passing therethrough.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carded out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new static electricity exhaust treatment device apparatus and method which has many of the advantages of the automobile exhaust emission controls mentioned heretofore and many novel features that result in a static electricity exhaust treatment device which is not anticipated, rendered obvious, suggested, or even implied by any of the prior art tool guides, either alone or in any combination thereof.

It is another object of the present invention to provide a new static electricity exhaust treatment device which may be easily and efficiently manufactured and marketed.

It is a further object of the present invention to provide a new static electricity exhaust treatment device which is of a durable and reliable construction.

An even further object of the present invention is to provide a new static electricity exhaust treatment device which is susceptible of a low cost of manufacture with regard to both materials and labor, and which accordingly is then susceptible of low prices of sale to the consuming public, thereby making such static electricity exhaust treatment devices economically available to the buying public.

Still yet another object of the present invention is to provide a new static electricity exhaust treatment device which provides in the apparatuses and methods of the prior art some of the advantages thereof, while simultaneously overcoming some of the disadvantages normally associated therewith.

Still another object of the present invention is to provide a new static electricity exhaust treatment device for treating automobile exhaust with a static electrical charge.

Yet another object of the present invention is to provide a new static electricity exhaust treatment device which includes a housing having inlet and outlet ports positionable into communication with an exhaust pipe of a vehicle, and a folded mesh panel undulating through the housing and receiving a static electrical charge to reduce emissions from exhaust gases passing therethrough.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 1 is a bottom isometric illustration of a static electricity exhaust treatment device according to the present invention in use.

FIG. 2 is an isometric illustration of the invention, per se.

DESCRIPTION OF THE PREFERRED EMBODIMENT

Figure 3:
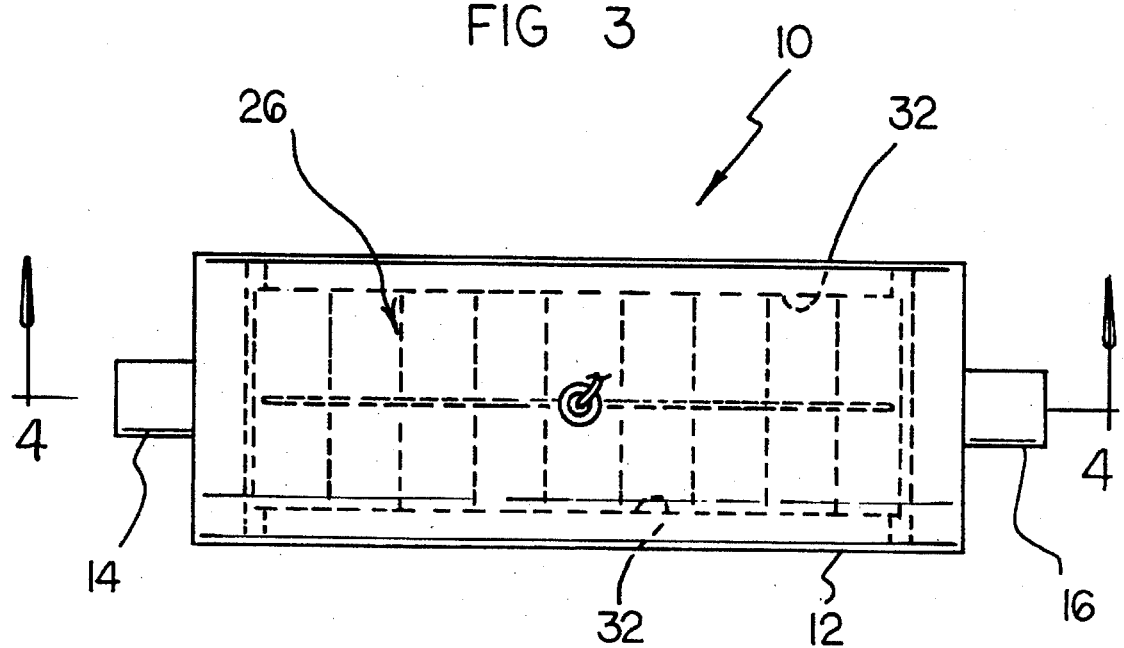
FIG. 3 is a top plan view of a portion of the present invention.

With reference now to the drawings, and in particular to FIGS. 1-4 thereof, a new static electricity exhaust treatment device embodying the principles and concepts of the present invention and generally designated by the reference numeral 10 will be described.

Figure 4:
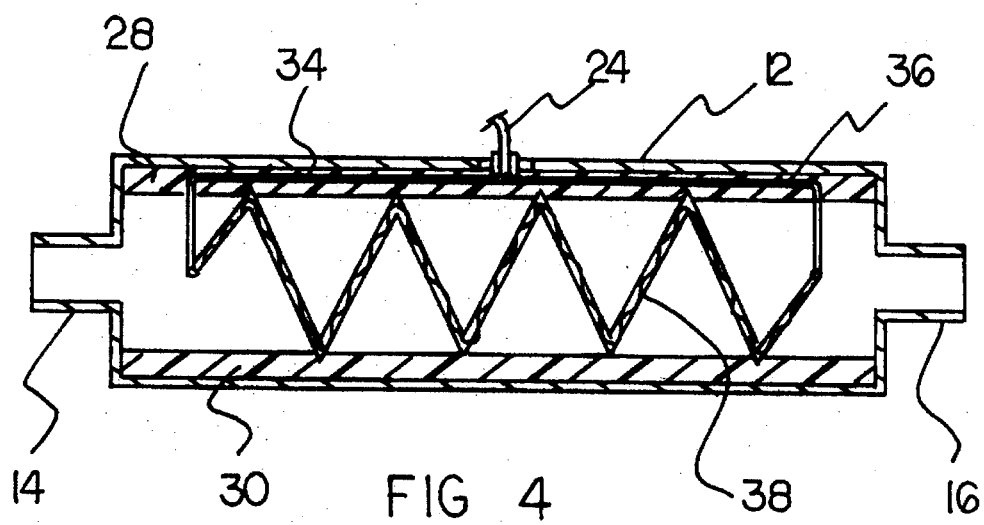
FIG. 4 is a cross sectional view taken along line 4—4 of FIG. 3.

More specifically, it will be noted that the static electricity exhaust treatment device 10 comprises a hollow housing 12 having an inlet port 14 extending from a first end thereof and an outlet port 16 extending from a second end thereof so as to permit the device 10 to be inserted in-line with an exhaust pipe 18 and a muffler 20 of a conventionally known exhaust system of a vehicle. A static electricity generator 22 of conventionally known construction generates a static electrical charge dispensed therefrom through a static charge supply wire 24 extending into the housing 12. A charge dispensing means 26 is mounted within the housing 12, as shown in FIGS. 3 and 4, for contacting exhaust gases passing through the device 10 to effect application of a static electrical charge thereto. By this structure, emissions of automobile exhaust passing through the device 10 are believed to be significantly reduced.

Referring now to FIGS. 3 and 4 wherein the present invention 10 is illustrated in detail, it can be shown that the charge dispensing means 26 of the present invention 10 preferably comprises an upper insulating panel 28 mounted to an upper interior surface of the housing 12, with a lower insulating panel 30 being similarly mounted to a lower interior surface of the housing. Lateral insulating panels 32 extend along opposed interior sides of the housing 12 and into contiguous communication extending between the upper and lower insulating panels 28 and 30. The static charge supply wire extends through an unlabeled and insulated aperture in the housing 12 into the upper insulating panel 28. A first distribution wire 34 extends from electrical communication with the static charge supply wire 24 through the upper insulating panel 28 towards the inlet port 14 of the housing 12. Similarly, a second distribution wire 36 extends from electrical communication with the static charge supply wire 24 through the upper insulating panel 28 towards the outlet port 16 of the housing 12. A folded mesh panel 38 extends transversely between the lateral insulating panels 32 and undulates in a zig-zag configuration between the upper insulating panel 28 and the lower insulating panel 30. The distribution wires 34 and 36 are electrically coupled to opposed ends of the folded mesh panel 38 so as to evenly dispense a static electrical charge thereinto. By this structure, exhaust gases passing through the housing 12 from the inlet port 14 to the outlet port 16 are forced into repeated contact with the folded mesh panel 38 of the charge dispensing means 26 so as to ensure contact of substantially all the exhaust gas with at least a portion of the folded mesh panel 38. Preferably, the folded mesh panel 38 comprises a screen matrix of conductive wires electrically coupled together.

The static electricity generator 22 of the present invention 10 may comprise any conventionally known static charge generating device. Suitable static electricity generators are disclosed within the U.S. Pat. Nos. 4,385,340; 4,477,767; and 3,702,965, all of which are incorporated herein by reference.

In use, the static electricity exhaust treatment device 10 of the present invention can be easily installed into series communication with an existing exhaust system of an associated vehicle. The present invention 10 is believed to significantly reduce exhaust emissions generated by an engine of the associated vehicle as the static electrical charge encourages or promotes chemical change within the exhaust gases.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. A static electricity exhaust treatment device comprising:

a hollow housing having inlet and outlet ports extending therefrom to permit the device to be inserted in-line with an exhaust pipe and a muffler of an exhaust system of a vehicle;

a charge dispensing means mounted within the housing for contacting exhaust gases passing through the housing and receiving a static electrical charge to effect application of the static electrical charge to the exhaust gases passing through the housing, the charge dispensing means comprising an upper insulating panel mounted to an upper interior surface of the housing; a lower insulating panel mounted to a lower interior surface of the housing; and lateral insulating panels extending along opposed interior sides of the housing and into contiguous communication extending between the upper and lower insulating panels; a static charge supply wire extending through an aperture in the housing into the upper insulating panel; and a folded mesh panel positioned in electrical communication with the static charge supply wire and extending transversely across an interior of the housing, the folded mesh panel undulating in a zig-zag configuration in contact with and between the upper insulating panel and the lower insulating panel.

2. The static electricity exhaust treatment device of claim 1, wherein the charge dispensing means further comprises a first distribution wire extending from within electrical communication with the static charge supply wire through the upper insulating panel towards the inlet port of the housing; and a second distribution wire extending from within electrical communication with the static charge supply wire through the upper insulating panel towards the outlet port of the housing, the distribution wires being electrically coupled to opposed ends of the folded mesh panel so as to evenly dispense a static electrical charge thereinto.

3. The static electricity exhaust treatment device of claim 2, wherein the folded mesh panel comprises a screen matrix of conductive wires electrically coupled together.

4. The static electricity exhaust treatment device of claim 3, and further comprising a static electricity generator electrically coupled to the static charge supply wire.

5. A static electricity exhaust treatment device comprising:

a vehicle having an exhaust system including an exhaust pipe and a muffler;

a hollow housing having inlet and outlet ports extending therefrom, the ports being positioned in communication with the exhaust system of the vehicle; and a charge dispensing means mounted within the housing for contacting exhaust gases passing through the housing and receiving a static electrical charge to effect application of the static electrical charge to the exhaust gases passing through the housing, the charge dispensing means comprising an upper insulating panel mounted to an upper interior surface of the housing; a lower insulating panel mounted to a lower interior surface of the housing; and lateral insulating panels extending along opposed interior sides of the housing and into contiguous communication extending between the upper and lower insulating panels; a static charge supply wire extending through an aperture in the housing into the upper insulating panel; and a folded mesh panel positioned in electrical communication with the static charge supply wire and extending transversely across an interior of the housing, the folded mesh panel undulating in a zig-zag configuration in contact with and between the upper insulating panel and the lower insulating panel.

6. The static electricity exhaust treatment device of claim 5, wherein the charge dispensing means further comprises a first distribution wire extending from within electrical communication with the static charge supply wire through the upper insulating panel towards the inlet port of the housing; and a second distribution wire extending from within electrical communication with the static charge supply wire through the upper insulating panel towards the outlet port of the housing, the distribution wires being electrically coupled to opposed ends of the folded mesh panel so as to evenly dispense a static electrical charge thereinto.

7. The static electricity exhaust treatment device of claim 6, wherein the folded mesh panel comprises a screen matrix of conductive wires electrically coupled together.

8. The static electricity exhaust treatment device of claim 7, and further comprising a static electricity generator electrically coupled to the static charge supply wire.

* * * * *